US007527734B1

(12) United States Patent
Shepherd

(10) Patent No.: US 7,527,734 B1
(45) Date of Patent: May 5, 2009

(54) RAPID NON-EQUILIBRIUM DECOMPRESSION OF MICROORGANISM-CONTAINING WASTE STREAMS

(76) Inventor: Samuel L. Shepherd, 4370 Hwy 6 N., #215, Houston, TX (US) 77084

( * ) Notice: Subject to any disclaimer, the term of this patent is extended or adjusted under 35 U.S.C. 154(b) by 135 days.

(21) Appl. No.: 11/274,935

(22) Filed: Nov. 15, 2005

(51) Int. Cl.
*C02F 3/00* (2006.01)
*C12N 1/06* (2006.01)

(52) U.S. Cl. ........................ 210/603; 210/631; 435/259

(58) Field of Classification Search ................. 210/603, 210/609, 631; 435/173.1, 259
See application file for complete search history.

(56) References Cited

U.S. PATENT DOCUMENTS 3,994,780 A * 11/1976 Klass et al. ................. 435/167
4,476,225 A * 10/1984 Grigorian et al. ........ 435/306.1
4,609,469 A * 9/1986 Keoteklian .................. 210/609
5,306,637 A * 4/1994 Lin et al. .................... 435/259
6,013,183 A * 1/2000 Stephenson et al. ......... 210/606
6,056,880 A * 5/2000 Boss et al. .................. 210/695
6,479,277 B2 * 11/2002 Duncan ................... 435/283.1
6,664,049 B1 * 12/2003 Chevalier ....................... 435/6
2004/0144735 A1 * 7/2004 Shepherd et al. ............ 210/769
2005/0109713 A1 * 5/2005 Shepherd et al. ............ 210/769

* cited by examiner

*Primary Examiner*—Fred Prince
(74) *Attorney, Agent, or Firm*—Egbert Law Offices PLLC

(57) ABSTRACT

A process for treating a microorganism-containing stream includes the steps of passing the stream through a chamber, pressurizing the stream in the chamber to a pressure greater than 14.7 p.s.i.g., introducing a feed gas into the pressurized stream such that the feed gas is soluable within the microorganisms, and depressurizing the stream so as to cause the soluablized feed gas to expand within the microorganisms so as to rupture the cell walls of the microorganisms. The feed gas can be carbon dioxide, air, nitrogen, methane, or mixtures thereof.

15 Claims, 1 Drawing Sheet

RAPID NON-EQUILIBRIUM DECOMPRESSION OF MICROORGANISM-CONTAINING WASTE STREAMS

RELATED U.S. APPLICATIONS

Figure 1:
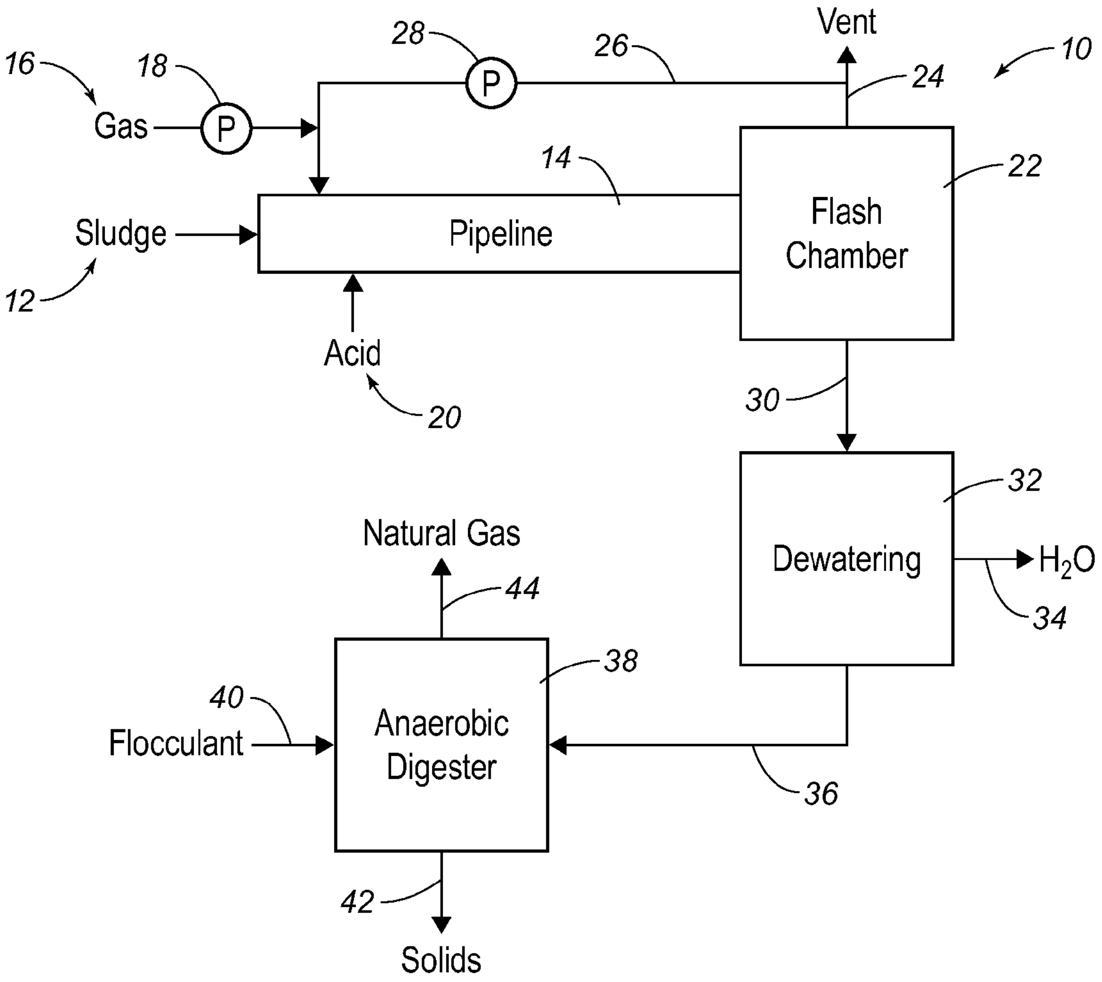

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to wastewater treatment. More particularly, the present invention relates to anaerobic and aerobic digestion processes that are enhanced through microorganism cell lysis, sludge particle reduction and increases in available soluble organic matter. Furthermore, the present invention relates to processes for removing interstitial water from cellular material during wastewater treatment processes.

BACKGROUND OF THE INVENTION

Sewage is composed of the liquid and water-carried wastes from residences, commercial buildings, industrial plants, and institutions, together with any groundwater, surface water and storm water which may be present. The terms “wastewater” and “sewage” are sometimes used interchangeably. The composition of sewage depends upon its origin and the volume of water in which the wastes are carried. Sewage which originates entirely from residential communities is made up of excreta, bathing and washing water, and kitchen wastes. Other wastes can be present from rural/agricultural sources and/or industrial or commercial establishments.

Modern sewage treatment is generally divided into three phases: primary, secondary and tertiary. Each of these steps produces sludge, which can be disposed of or used for various purposes. Sludge is the semiliquid mass removed from the liquid flow of sewage. Sludge will vary in amount and character with the characteristics of sewage and plant operation. Sludge from primary treatment is composed of solids usually having a ninety-five percent moisture content. The accumulated solid materials, or sludge, from sewage treatment processes amount to fifty to seventy pounds per person per year in the dry state or about one ton per year in the wet state. Sludge is highly capable of becoming putrid and can, itself, be a major pollutant if it is not biologically stabilized and disposed of in a suitable manner. Biological stabilization can be accomplished by either aerobic or anaerobic digestion. After digestion, sludge-drying beds are usually used.

In modern sewage treatment plants, mechanical dewatering of sludge by vacuum filters, centrifuges, belt presses, or other devices is becoming widespread. Many kinds of sludges are difficult to dewater with conventional dewatering equipment such as chamber filter presses, belt filter presses and other similar equipment. Therefore, prior conditioning is necessary so as to improve the capability for dewatering. In the past, such conditioning is generally achieved by the addition of one or several chemicals acting as flocculation agents. The capability for dewatering which has been achieved by conditioning will depend strongly upon the quantity, size and especially the structure and stability of the formed floc particles. Unfortunately, the use of such flocculation agents is a rather expensive process and, as such, it is considered desirable to use flocculants very sparingly.

One of the major problems associated with prior attempts to dewater sludge prior to introduction into such belt presses is the fact that a great deal of water is retained within the interstitial structures of the organisms. Typically, belt presses will only extract external water from the cell membranes. The belt presses are generally ineffective in extracting the interstitial water accumulated within the cell membranes. As a result, belt presses have been generally ineffective at removing a large amount of the water from the sludge. In order to fully remove the water from the sludge, it would be necessary to gain access to the interstitial water accumulated within the cell membrane walls of the cells within the wastewater sludge.

In the past, various patents have issued relating to dewatering processes. For example, U.S. Pat. No. 6,101,738, issued on Oct. 15, 2000 to G. Gleason, describes a sludge dewatering system in which the sludge is dewatered by introducing pressurized air into the sludge. The air serves to strip the sludge of its water and thereby increase the total solids captured with respect to time. The pressurized air is applied through the surfaces of the belt press so as to “blow” through the sludge accumulated upon the belt press.

U.S. Pat. No. 6,051,137, issued on Apr. 18, 2000 to F. D. Deskins, describes a process of dewatering primary-treated sewage which includes the step of mixing the sewage with a coagulant or flocculant, such as an activated polymer. The sewage is then mixed and flocculated at conditions which involve extensive mixing turbulence of the sewage whereby part of the sewage is recycled so as to be subjected to mixing and flocculating. The pH of the sewage is chemically adjusted to the basic pH range. The sewage is applied to a sand bed whereby the flocculated solids in the sewage are separated from the liquid in the sewage. The flocculated solids located on the top of the sand bed are then air dried.

U.S. Pat. No. 5,961,827, issued on Oct. 5, 1999 to A. Bahr, describes an apparatus for dewatering sludge which includes a sludge chamber provided with filter areas having at least one sludge inlet connected to a device for forming a hydrostatic filtration pressure. The sludge chamber is formed by pressure plates that can be pressed against each other to create mechanical dewatering pressure. There is a predewatering stage containing filter areas which forms a compensation container and which is connected to a continuous sludge feed.

U.S. Pat. No. 5,885,445, issued on Mar. 23, 1999 to Andrews et al., describes a belt press for dewatering sludge. The press includes a camera to monitor the physical operation of a gravity belt section of the press. A numerical control device utilizes electromagnetic radiation received from the gravity belt section to control the physical operation of the belt section.

U.S. Pat. No. 5,770,056, issued on Jun. 23, 1998 to F. D. Deskins, is related to the later issued U.S. Pat. No. 6,051,137 and also describes the process of dewatering primary-treated sewage by adding a coagulant or a flocculent to the mixed sewage.

U.S. Pat. No. 5,366,622, issued on Nov. 22, 1994 to S. Geyer, describes a process for the dewatering of sludge which involves the addition of a flocculant to the sludge suspension. A pressure pipe is placed between a feed pump and dewatering equipment. There are a number of dosing points located along the pressure pipe so as to allow for the introduction of the flocculant at desired location during the feed of the sewage toward the dewatering equipment.

U.S. Pat. No. 4,767,537, issued on Aug. 30, 1988 to H. F. Davis, teaches the dewatering of sludge by the addition of nitrate ions to the treated sludge so as to generate microscopic bubbles of nitrogen gas that adhere to the sludge floc particles. This causes a reduction in density of the particles which, in turn, causes the particles to float to the top of a thickening tank. The process separates the sludge into an upper thickened layer and a lower free water layer.

The present inventor is also the inventor on several prior issued U.S. patents for processes for treating waste sludge of biological solids. In particular, U.S. Pat. No. 5,635,069, issued on Jun. 3, 1997, describes a process for treating waste sludge of biological solids that includes the steps of mixing the sludge with an oxide-containing chemical and sulfamic acid so as to elevate a temperature of the sludge, pressurizing the mixed sludge to a pressure of greater than 14.7 p.s.i.g., and discharging the pressurized mixed sludge. This sludge has a water content of between 5 and 85 percent. The oxide-containing chemical and the acid are reacted with the sludge so as to elevate the temperature of the sludge to between 50° C. and 450° C. The pressurized mixed sludge is flashed across a restricting orifice or passed into a chamber having a lower pressure. The evaporated liquid component can be condensed and used as part of the process.

U.S. Pat. No. 5,868,942, issued on Feb. 9, 1999, teaches a process for treating a pathogen-containing sludge of biological solids. This process includes the steps of mixing the sludge with calcium oxide, ammonia and carbon dioxide so as to elevate a temperature of the mixed sludge to between 50° C. and 140° C. and to elevate a pH of the mixed sludge to greater than 9.8. The process also includes the steps of pressurizing the mixed sludge to a pressure of greater than 14.7 p.s.i.a., and discharging the pressurized mixed sludge. The sludge has a water content of between 65% and 94% by weight. The pressurized mixed sludge is discharged by flashing the sludge across a restricting orifice and by evaporating a liquid component of the flashed sludge.

U.S. Pat. No. 6,056,880, issued on May 2, 2000, describes a process for treating a waste sludge of biological solids which includes the steps of blending the sludge with an acid, mixing an oxide-chemical with the blended sludge so as to cause a reaction which elevates a temperature of the sludge, pressurizing the mixed sludge to a pressure of greater than 14.7 p.s.i.a. and retaining the mixed sludge at such pressure for a period of time of no less than 15 seconds, and discharging the pressurized mixed sludge. The step of pressurizing is accomplished by passing the mixed sludge as a flow into the pipe. An immersion heater or a magnetic field is installed so as to apply heat directly to the mixed sludge as the mixed sludge passes through the pipe.

U.S. Pat. No. 6,214,064, issued on Apr. 10, 2001, describes a process for making a fuel product from coal fines and sewage sludge. In this process, the sewage sludge is blended with an acid and mixed with an oxide-containing chemical so as to cause a reaction which elevates a temperature of the sludge. This mixtures is then pressurized to a pressure of greater than 14.7 p.s.i.a. for a period of time of no less than 15 seconds. The pressurized mixed sludge is mixed with coal fines. This mixture is then solidified. The acid that is introduced is sulfamic acid.

It is an object of the present invention to provide a process for enhancing the digestion and for the dewatering of sludge to allow for the removal of the interstitial water from the cell membranes within the sludge and to decrease the amount of sludge removal.

It is another object of the present invention to provide a process which will reduce the water content of the sludge prior to passing to the belt press or other dewatering equipment.

It is another object of the present invention to provide a process which provides an acid treatment during the process to enhance carbon dioxide release.

It is still a further object of the present invention to provide a process for the dewatering of sludge which is extremely cost effective.

It is still a further object of the present invention to provide a process for the dewatering of sludge which achieves higher percent solids.

It is still another object of the present invention to provide a process which decreases the organic particle size of sludge in order to increase the conversion rate of carbon dioxide or methane.

It is a further object of the present invention to provide a process for the dewatering of sludge which is easy to use and install.

These and other objects and advantages of the present invention will become apparent from a reading of the attached specification and appended claims.

BRIEF SUMMARY OF THE INVENTION

The present invention is a process for treating a microorganism-containing stream that comprises the steps of: (1) passing the stream through a chamber; (2) pressurizing the stream in the chamber to a pressure greater than 14.7 p.s.i.g.; (3) introducing a feed gas into the pressurized stream such that the feed gas is soluable within the microorganisms in the pressurized stream; and (4) depressurizing the stream so as to cause the soluablized feed gas to expand within the microorganisms so as to rupture a cell wall of the microorganisms.

In the present invention, the feed gas is carbon dioxide, air, nitrogen, methane or mixtures thereof. The step of depressurizing includes passing the feed gas-introduced pressurized feed stream into a flash chamber. A gas product is produced from this flash chamber. The gas product can either be recycled back to the feed chamber or vented to the atmosphere.

After depressurizing, the stream is suitably dewatered. The dewatered stream can be anaerobically treated such that natural gas can be removed from the treated stream. A flocculant can be added to the treated stream so as to produce a solid product. The solid product can then be removed from the waste water treatment process.

In the present invention, the chamber can be a pipeline having a leg suitable for allowing the feed gas to defuse substantially throughout the pressurized stream.

BRIEF DESCRIPTION OF THE OF THE DRAWING

FIG. 1 is a schematic illustration of the process of the present invention.

DETAILED DESCRIPTION OF THE INVENTION

In FIG. 1 there is shown the process 10 in accordance with the preferred embodiment of the present invention. In the process of the present invention, a microorganism-containing sludge 12 is introduced into a chamber 14. The chamber 14 is a pipeline having a suitable length for carrying out the process of the present invention. A feed gas 16 is introduced into the chamber 14. The feed gas 16 is pressurized by pump 18 or delivered as a pressurized flow of gas from a tank. The gas 16 can be carbon dioxide, air, nitrogen, methane, or mixtures thereof. The pressurized gas is introduced into the chamber 14 so as to pressurize the interior of the chamber 14 to a pressure of greater than 14.7 p.s.i.g. The feed gas is soluable within the microorganisms in the sludge 12.

An acid 20 can also be added to the chamber 14. This acid is added to the chamber during the step of pressurizing so as to reduce a pH of the stream to less than 6.5. The acid can be either sulfamic acid, nitric acid, phosphoric acid, oxolic acid, hydrochloric acid or sulfuric acid. The chamber 14 has a suitable length for allowing the feed gas 16 to defuse substantially through the pressurized stream.

The chamber 14 will open to a flash chamber 22. Flash chamber 22 serves to depressurize the stream from the chamber 14 so as to cause the soluablized feed gas to expand within the microorganisms and to rupture the cell walls of the microorganism. In particular, this pressure can be accomplished by passing the pressurized feed stream through restricting orifices or simply opening the pipeline 14 into the flash chamber 22. The flash chamber 22 will have a lesser pressure therein than the pressure within the chamber 14.

The flashed stream will produce a gas product from the feed stream. This gas product can be discharged through outlet 24 of the flash chamber 22 so as to either vent to the atmosphere or pass along line 26 back to be recycled into the chamber 14. A pump 28 can be provided along line 26 to add pressure to the gas which is released from the flash chamber 22. As such, the present invention effectively avoids a waste of the gas product.

The solid/liquid component of the stream then passes along line 30 to a dewatering system 32. The dewatering system 32 will remove a substantial component of the water from the waste stream. Water will exit the dewatering 32 through line 34. A solid portion, along with a smaller liquid component, is then passed along line 36 to an anaerobic digester 38. The anaerobic digester 38 can include a line 40 for the introduction of a flocculent therefrom. The flocculent will tend to cause the solids in the waste product to clump together. As such, the solids can be discharged from the digester 38 through line 42. The product of the anaerobic digestion of the waste will be natural gas. Natural gas is released along line 44 from the digester 38.

In the present invention, a liquid-containing microorganism stream is compressed of pressures of greater than 14.7 p.s.i.g. A gas is then introduced into this microorganism stream. The properties of the feed gas are such that the feed gas is soluable in the microorganism stream. The feed gas, due to its rapid rate of defusion across the cell walls, is transported across the microorganism cell wall as a result of the high concentration gradient between the cell's interstitial water and the microorganism stream. The feed gas can be comprised of carbon dioxide, air, nitrogen, methane, or any combination thereof.

The gasified microorganism stream is then depressurized. The dissolved feed gas within the cell increases the cell volume by as much as 1837%. This rapid, non-equilibrium decompression causes exceedingly high shear rates and irreversible cell rupture. This decreases the particle size, releasing the interstitial water and, thereby, increases the biological oxygen demand in the microorganism stream. The remaining cell structures are dewatered using conventional dewatering equipment. The discharged gas is recycled to the front of the reactor and reused or discharged to the atmosphere. The small particle size and nutrient rich, high BOD, interstitial water, when collected and recycled back to the anaerobic digester, results in a 30 to 40% increase in natural gas production.

The percent solids resulting from this process increases from the conventional 18 to 22% to greater than 28% solids. Additionally, there is an increase in natural gas production. This natural gas production cost justifies the anaerobic digester capital costs over a seven year life cycle. The process is simple and effective in enhancing both dewatering and overall gas generation. This is accomplished without the energy requirements and operational problems plaguing current sonic technologies.

Experiments involving the process of the present invention show that single cell organisms appear to be totally disrupted. Helminth ova structures are disrupted with at least 50% of the eggs resembling "raisin" type structures as opposed to the "grape" intact structures of untreated samples. The average microorganism particle size is decreased by 60%. The settling time of the treated sample was increased by an average of 17 minutes. The microorganism blanket height of the treated sample was 22% lower than the untreated sample. Fecal coliform levels decreased only in the low pH trials (less than 4.5). The results of experiments with the present invention reach several conclusions. In particular, the polymer requirement to achieve flocculation is inversely proportional to the particle diameter. The small particle size of the microorganism resulted in a more compact microorganism blanket. It appears that the smaller particles are more conducive to shed water and compact tighter. The number of organisms relative to the number of particles is very low. Therefore, it is believed that it is not necessarily the case that organism cell lysis that improves digestion, but rather the creation of smaller microorganism particles. The surface area to volume of the particle is the major contributor to enhanced digestion. The greater the surface area to volume ratio, the greater the rate of digestion, the greater the rate of gas production, and the greater the polymer requirement to achieve flocculation. This increase in surface area to volume ratio is directly proportional to the log (shear rate).

The foregoing disclosure and description of the invention is illustrative and explanatory thereof. Various changes in the illustration of the construction can be made within the scope of the present invention without departing from the true spirit of the invention. The present invention should only be limited by the following claims and their legal equivalents.

I claim:

1. A process for treating a microorganism-containing stream comprising:
- passing the stream through a chamber;
- pressurizing the stream in said chamber to a pressure greater than 14.7 p.s.i.g.;
- introducing a feed gas into the pressurized stream, said feed gas being soluble within cell walls of the microorganisms in the pressurized stream; and
- depressurizing the stream so as to cause the solubilized feed gas to expand within the microorganisms, increasing cell volume up to approximately 19 times original volume so as to rupture the cell walls from within the microorganisms, increasing natural gas production by 30-40%, wherein the step of depressurizing comprises: passing the feed gas-introduced pressurized feed stream into a flash chamber.

2. The process of claim 1, said feed gas being selected from a group consisting of: carbon dioxide, air, nitrogen, methane, and mixtures thereof.

3. The process of claim 1, said step of depressurizing comprising:
- producing a gas product from said flash chamber; and
- recycling said gas product to said chamber.

4. The process of claim 1, said step of depressurizing comprising:

producing a gas product from said flash chamber; and venting the gas product to the atmosphere.

5. The process of claim 1, further comprising:

dewatering the depressurized stream.

6. The process of claim 1, further comprising:

anaerobically treating the depressurized stream; and removing natural gas from the treated stream.

7. The process of claim 6, said treating comprising:

adding a flocculent to the depressurized stream so as to produce a solid product; and removing said solid product.

8. The process of claim 1, further comprising:

adding an acid to said chamber during said step of pressurizing so as to reduce a pH of stream to less than 6.5.

9. The process of claim 8, said acid selected from the group consisting of nitric acid, phosphoric acid, oxolic acid, hydrochloric acid and sulfuric acid.

10. The process of claim 1, said chamber being a pipeline having a length suitable for allowing said feed gas to diffuse substantially through cell walls of the micro-organisms in said pressurized stream.

11. A process for treating a microorganism-containing stream comprising:

introducing a feed gas into the microorganism-containing stream;

passing said feed gas and the microorganism-containing stream into a chamber;

pressurizing said feed gas and said microorganism-containing stream in said chamber to a pressure of greater than 14.7 p.s.i.g., said feed gas being soluble within cell walls of the microorganisms in said pressurized stream; and depressurizing the stream so as to cause the solublized feed gas to expand within the microorganisms, increasing cell volume up to approximately 19 times original volume so as to rupture the cell walls from within the microorganisms, increasing natural gas production by 30-40%, wherein the step of depressurizing comprises: passing the pressurized feed stream into a flash chamber.

12. The process of claim 11, said feed gas selected from the group consisting of carbon dioxide, air, nitrogen, methane and mixtures thereof.

13. The process of claim 11, said step of depressurizing comprising:

producing a gas product from said flash chamber; and recycling said gas product to said chamber.

14. The process of claim 11, said step of depressurizing further comprising:

producing a gas product from said flash chamber; and venting the gas product to the atmosphere.

15. The process of claim 11, further comprising:

dewatering the depressurized stream.

* * * * *